(12) United States Patent  
Serizawa

(10) Patent No.: US 7,224,371 B2  
(45) Date of Patent: May 29, 2007

(54) PICTURE SIGNAL PROCESSOR, PICTURE SIGNAL PROCESSING METHOD, AND PICTURE SIGNAL PROCESSING PROGRAM PRODUCT

(75) Inventor: Orimitsu Serizawa, Gyouda (JP)

(73) Assignee: Sanyo Electric Co., Ltd., Osaka (JP)

( * ) Notice: Subject to any disclaimer, the term of this patent is extended or adjusted under 35 U.S.C. 154(b) by 247 days.

(21) Appl. No.: 11/020,347

(22) Filed: Dec. 22, 2004

(65) Prior Publication Data

US 2005/0190299 A1    Sep. 1, 2005

(30) Foreign Application Priority Data

Dec. 26, 2003    (JP) .............................. 2003-434862

(51) Int. Cl.
- *G09G 5/00* (2006.01)
- *H03L 7/00* (2006.01)
- *H04N 5/14* (2006.01)
- *H04N 9/74* (2006.01)
- *G06K 9/40* (2006.01)
- *H04N 9/64* (2006.01)
- *H04N 5/21* (2006.01)
- *G06K 9/32* (2006.01)

(52) U.S. Cl. ..................... 345/606; 345/589; 382/260; 382/264; 382/300; 348/537; 348/571

(58) Field of Classification Search ................ 345/428, 345/581, 589, 606–607, 611, 613, 618; 382/162–167, 382/300, 254, 260, 264; 348/453, 572, 612, 348/624, 496, 502, 498, 489, 517, 537, 539, 348/571, 582; 358/518, 525

See application file for complete search history.

(56) References Cited

U.S. PATENT DOCUMENTS

| | | | |
|---|---|---|---|
| 6,137,349 A | * | 10/2000 | Menkhoff et al. ............ 327/552 |
| 6,486,859 B1 | * | 11/2002 | Croll et al. .................... 345/72 |
| 2002/0122044 A1 | * | 9/2002 | Deering ....................... 345/597 |

FOREIGN PATENT DOCUMENTS

JP    2002-100989    4/2002

OTHER PUBLICATIONS

Patent Abstracts of Japan, Publication No. 2002-100989, Publication Date Apr. 5, 2002, 2 pages.

* cited by examiner

*Primary Examiner*—Wesner Sajous  
(74) *Attorney, Agent, or Firm*—Osha Liang LLP

(57) ABSTRACT

The invention provides a picture signal processor comprising: a sampling circuit that receives picture signals of a plurality of standard colors separated from a video signal and samples the picture signals of the plurality of standard colors in turn repeatedly; and an interpolation filter that receives the sampling values sampled from the plurality of standard colors in the sampling circuit and finds interpolated values at a common reference interpolation time for all the standard colors by subjecting the sampling values to interpolation calculation for each standard color. The use of the interpolated values at the reference interpolation time can reduce the color blur of the color video signal.

9 Claims, 15 Drawing Sheets

| COUNT VALUE | CHANGEOVER SWITCH CIRCUIT 20a | CHANGEOVER SWITCH CIRCUIT 20b |
|---|---|---|
| 0 | a4−a0 | b0−b4 |
| 1 | a1−a0 | b0−b1 |
| 2 | a2−a0 | b0−b2 |
| 3 | a3−a0 | b0−b3 |

Fig. 2

| COEFFICIENT | PHASE | | |
|---|---|---|---|
| | 1 | 2 | 3 |
| $\alpha_1$ | 7 | 5 | 2 |
| $\alpha_2$ | -16 | -5 | 3 |
| $\alpha_3$ | 2 | -20 | -28 |
| $\alpha_4$ | 161 | 124 | 80 |
| $\alpha_5$ | 124 | 161 | 182 |
| $\alpha_6$ | -20 | 2 | 36 |
| $\alpha_7$ | -5 | -16 | -25 |
| $\alpha_8$ | 5 | 7 | 7 |

Fig. 6

| COUNT VALUE | CHANGEOVER SWITCH CIRCUIT 40a | CHANGEOVER SWITCH CIRCUIT 40b |
|---|---|---|
| 0 | a1−a0 | b0−b1 |
| 1 | a2−a0 | b0−b2 |
| 2 | a3−a0 | b0−b3 |

Fig. 8

| ADJUSTMENT CLOCK COUNTER | PHASE CLOCK COUNTER | WORKING TAP |
|---|---|---|
| 0 | 0 | C1 |
|   | 1 | C1 |
|   | 2 | C1 |
| 1 | 0 | C2 |
|   | 1 | C4 |
|   | 2 | C2 |
| 2 | 0 | C5 |
|   | 1 | C3 |
|   | 2 | C5 |
| 3 | 0 | — |
|   | 1 | — |
|   | 2 | — |

Fig. 10

| ADJUSTMENT CLOCK COUNTER | PHASE CLOCK COUNTER | PHASE |
|---|---|---|
| 0 | 0 | 0 |
|   | 1 | 1 |
|   | 2 | 2 |
| 1 | 0 | 1 |
|   | 1 | 2 |
|   | 2 | 0 |
| 2 | 0 | 2 |
|   | 1 | 0 |
|   | 2 | 1 |
| 3 | 0 | — |
|   | 1 | — |
|   | 2 | — |

Fig. 11

| COEFFICIENT | PHASE | | |
|---|---|---|---|
| | 0 | 1 | 2 |
| $\alpha_1$ | 3 | 4 | 1 |
| $\alpha_2$ | -6 | -15 | -22 |
| $\alpha_3$ | -17 | 4 | 42 |
| $\alpha_4$ | 91 | 136 | 163 |
| $\alpha_5$ | 163 | 136 | 91 |
| $\alpha_6$ | 42 | 4 | -17 |
| $\alpha_7$ | -22 | -15 | -6 |
| $\alpha_8$ | 1 | 4 | 3 |

Fig. 12

PICTURE SIGNAL PROCESSOR, PICTURE SIGNAL PROCESSING METHOD, AND PICTURE SIGNAL PROCESSING PROGRAM PRODUCT

CROSS-REFERENCE TO RELATED APPLICATIONS

The entire disclosure of Japanese Application No. 2003-434862 including specification, claims, drawings and abstract is incorporated herein by reference.

BACKGROUND OF THE INVENTION

1. Field of the Invention

The present invention relates to a picture signal-processor, a picture signal processing method, and a picture signal processing program product that can compensate for color blur arising from sampling of a video signal.

2. Description of the Related Art

When a color video signal is processed, processing is performed after the color video signal has been separated into signals of red (R), green (G), and blue (B) that are standard colors. For example, when a video signal is digitized, sampling is executed for each of the picture signals of RGB at an identical sampling timing, as shown in FIG. 15, and digitization is executed using an analog-to-digital converter (A/D converter). By sampling the picture signals of the standard colors at the identical sampling time in this way, it is possible to eliminate the color blur that may occur when sampling values of all the standard colors are superimposed later and displayed.

At this time, if individual A/D converters are prepared for picture signals of RGB, respectively, it comes with problems, such as enlargement of a circuit scale of the picture signal processing circuit and increase in power consumption. Therefore, as shown in FIG. 14, generally considered is a method in which a changeover switch 10 is provided, the picture signals of RGB are changed over in turn by a control circuit 12, and the picture signal thus switched is inputted into a single A/D converter 14 and outputted therefrom in time with a predetermined phase clock Cp.

However, in the case where the picture signals of RGB are A/D converted according to the phase clock Cp by changing over the picture signals in turn, a sampling timing of each signal will be shifted by a time equal to an integer times the phase clock Cp, as shown in FIG. 16. As a result, deviation of signal intensity D arises in each picture signal (G and B) compared to that in the case where all the picture signals of RGB are sampled at an identical sampling timing. Consequently, when the picture signals of RGB are superimposed finally to perform display, it becomes a cause of producing the color blur.

The present invention has for its object the provision of a picture signal processor, a picture signal processing method, and a picture signal processing program product that compensate for the color blur of picture signals in view of the above-mentioned problem of the conventional technology.

SUMMARY OF THE INVENTION

One mode for carrying out the present invention is a picture signal processor comprising: a sampling circuit that receives picture signals of a plurality of standard colors separated from a video signal and samples the picture signals of the plurality of standard colors in turn repeatedly; and an interpolation filter that receives the sampling values sampled from the plurality of standard colors in the sampling circuit and finds interpolated values at a common reference interpolation time for all the standard colors by subjecting the sampling values to interpolation calculation for each standard color.

Another mode for carrying out the present invention is a picture signal processing method comprising: a sampling step of receiving picture signals of a plurality of standard colors separated from a video signal and sampling the picture signals of the plurality of standard colors in turn repeatedly; and an interpolation step of receiving the sampling values sampled from the plurality of standard colors in the sampling step and finding interpolated values at a common reference interpolation time for all the standard colors by subjecting the sampling values to interpolation calculation for each standard color.

Further another mode for carrying out the present invention is a picture signal processing program product that allows a computer to function as a picture signal processor comprising: a sampling circuit that receives picture signals of a plurality of standard colors separated from a video signal and samples the picture signals of the plurality of standard colors; and an interpolation filter that receives the sampling values sampled from the plurality of standard colors in the sampling circuit and finds interpolated values at a common reference interpolation time for all the standard colors by subjecting the sampling values to interpolation calculation for each standard color.

BRIEF DESCRIPTION OF THE DRAWINGS

FIG. 2 is a table showing the relationship between a count value of a phase clock counter and a connection state of a changeover switch circuit in the first embodiment.

FIG. 6 is a table showing set values of coefficients of the interpolation filter in the first embodiment.

FIG. 8 is a table showing the relationship of a count value of a phase clock counter and a connection state of a changeover switch circuit in the second embodiment.

FIG. 10 is a table showing the relationship among count values of the phase clock counter and of an adjustment clock counter and the connection state of the changeover switch circuit in the second embodiment.

FIG. 11 is a table showing the relationship between the count values of the phase clock counter and of the adjustment clock counter and a phase of the interpolation filter in the second embodiment.

FIG. 12 is a table showing set values of coefficients of the interpolation filter in the second embodiment.

DESCRIPTION OF THE PREFERRED EMBODIMENTS

First Embodiment

Figure 1:
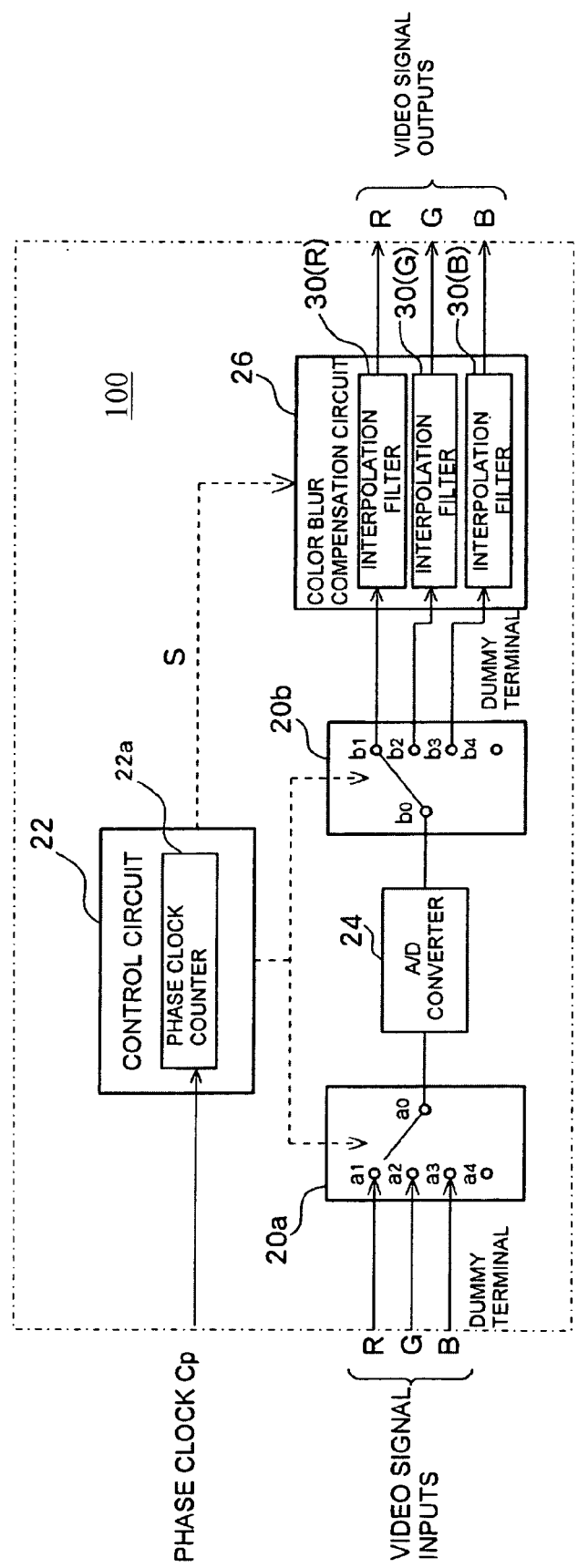
FIG. 1 is a block diagram showing a configuration of a picture signal processor in a first embodiment.

A picture signal processor 100 in the first embodiment of the present invention is constructed with the inclusion of changeover switch circuits 20a, 20b, a control circuit 22, an A/D converter 24, and a color blur compensation circuit 26, as shown in FIG. 1.

The changeover switch circuit 20a is a changeover switch with four input terminals and one output terminal. A color video signal is separated into picture signals of the standard colors of red (R), green (G), and blue (B), which are fed to input terminals $a_1$–$a_3$ of the change over switch circuit 20a, respectively. An output terminal $a_0$ of the changeover switch circuit 20a is connected to an input terminal of the A/D converter 24. An input terminal $a_4$ of the changeover switch circuit 20a is a dummy terminal. The changeover switch circuit 20b is a changeover switch with one input terminal and four output terminals. An output signal from the A/D converter 24 is fed to an input terminal $b_0$ of the changeover switch circuit 20b, which outputs the output signal from one of its output terminals $b_1$–$b_4$ according to a connection state of the changeover switch. An output terminal $b_4$ of the changeover switch circuit 20b is a dummy terminal.

The control circuit 22 is constructed with the inclusion of a phase clock counter 22a. The phase clock Cp for establishing synchronization of sampling timing of the picture signals is inputted into the control circuit 22 from outside the picture signal processor 100. The phase clock counter 22a is a 2-bit counter, and counts the phase clock Cp each time it becomes a "H level", changing its count value among 0, 1, 2, and 3 in this order repeatedly. The control circuit 22 outputs control signals to the changeover switches 20a, 20b according to the count value of the phase clock counter 22a.

The changeover switch circuits 20a and 20b are changed over by the control signals from the control circuit 22, respectively. In this case, the changeover is controlled so that the terminals $a_1$ and $b_1$, the terminals $a_2$ and $b_2$, and the terminals $a_3$ and $b_3$, each making a pair, are connected to the A/D converter 24 at an identical timing, respectively, according to the count value of the phase clock counter 22a, as shown in FIG. 2. At the time the count value of the phase clock counter 22a is 0, the A/D converter 24 does not perform sampling because it is connected to the dummy terminal. At the time the count value of the phase clock counter 22a is 1, the input terminal $a_1$ is connected to the output terminal $a_0$, and the input terminal $b_0$ is connected to the output terminal $b_1$, whereby the picture signal of R is inputted into the A/D converter 24 and sampled to perform digitization. Similarly, at the time the count value of the phase clock counter 22a is 2, the picture signal of G is sampled to perform digitization; at the time the count value of the phase clock counter 22a is 3, the picture signal of B is sampled to perform digitization. Therefore, assuming that the phase clock Cp is a frequency $f_0$, each of the picture signals of R, G, and B is sampled with a sampling frequency $f_0/4$.

For example, if setting the frequency $f_0$ of the phase clock Cp to 27 MHz, the picture signals of R, G, and B are sampled with a sampling frequency of $f_0/4=6.75$ MHz, respectively. Assuming that, when a picture signal is sampled with a sampling frequency of 13.5 MHz, a single horizontal line is represented with 720 pixels, when each of the picture signals of R, G, and B is sampled with a sampling frequency of 6.75 MHz, a single horizontal line will be represented with 360 pixels. That is, a picture is displayed in a state where the number of pixels in the horizontal direction is compressed into one half.

Each of the digitized picture signals of R, G, and B are outputted into the color blur compensation circuit 26 after being outputted from the changeover switch circuit 20b. It is preferable that the color blur compensation circuit 26 has low pass filter characteristics having a passband ranging from 0 to a frequency determined by calculation of ½ the reciprocal of the period of the reference interpolation time. For example, it is preferable that the color blur compensation circuit 26 is constructed with digital interpolation filters each of which has a passband of frequencies $0$–$f_0/8$ as shown ideally by line A (solid line) in FIG. 3 in order to support the frequency $f_0/4$ corresponding to the number of pixels in the horizontal direction. For each of the digitized picture signals of R, G, and B, one interpolation filter 30 may be provided independently. Alternatively, filter calculation may be done in a time division manner with provision of changeover switches. The interpolation filters 30 estimate interpolated values at the reference interpolation time common to all the picture signals of R, G, and B by subjecting the plurality of sampling values for each of the picture signals of R, G, and B to interpolation calculation.

Figure 4:
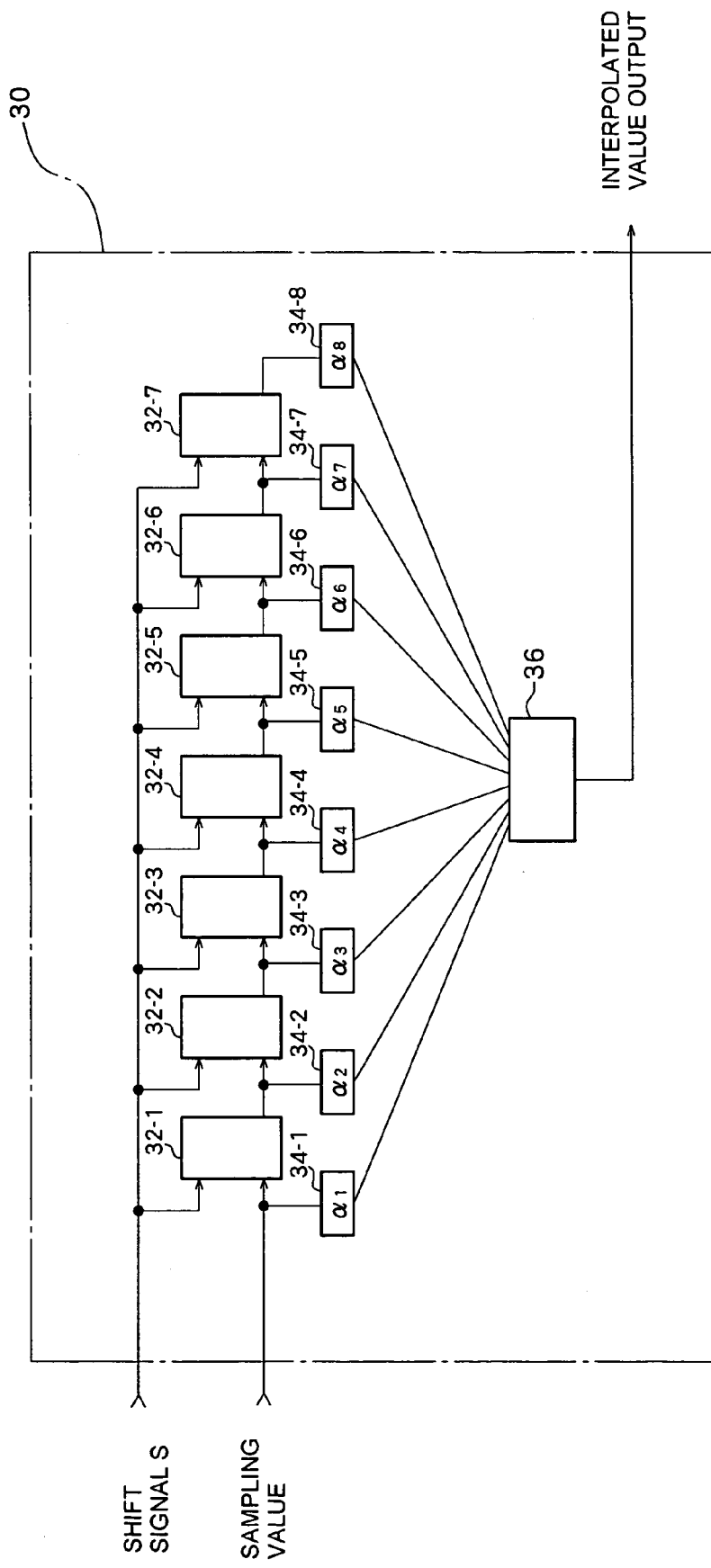
FIG. 4 is a circuit diagram showing a configuration of the interpolation filter in the first embodiment.

For example, the interpolation filter 30 for the picture signal of R included in the color blur compensation circuit 26 can be constructed with a digital filter with eight taps, as shown in FIG. 4. More specifically, the interpolation filter 30 is constructed with the inclusion of seven shift registers 32-1 to 32-7, eight coefficient arithmetic units 34-1 to 34-8, and an adder 36.

The shift registers 32-1 to 32-7 hold the sampling values of the picture signal of R inputted from the changeover switch circuit 20b. The control circuit 22 outputs control signals for selecting the picture signal of R to the changeover switch circuits 20a, 20b, and subsequently outputs a shift signal S to the interpolation filter 30 for the picture signal of R at the time at which the changeover switch circuit 20b newly outputs a digitized sampling value of the picture signal of R. When receiving the shift signal S, the interpolation filter 30 shifts data held in each of the shift registers 32-1 to 32-7 to subsequent shift registers on the right, respectively. The shift register 32-1 newly holds a sampling value inputted from the changeover switch 20b.

Both the sampling value inputted newly into the interpolation filter 30 and the sampling values held in the shift registers 32-1 to 32-7 are outputted to the coefficient arithmetic units 34-1 to 34-8, respectively. The coefficient arithmetic units 34-1 to 34-8 calculate products of both the sampling value inputted newly into the interpolation filter 30 and the sampling values held in the shift registers 32-1 to 32-7 and the coefficients $\alpha_1$–$\alpha_8$ determined for the coefficient arithmetic units 34-1 to 34-8, respectively, and output them to the adder 36. The adder 36 adds all the calculated values received from the coefficient arithmetic units 34-1 to 34-8 and outputs the sum as an estimate.

Figure 5:
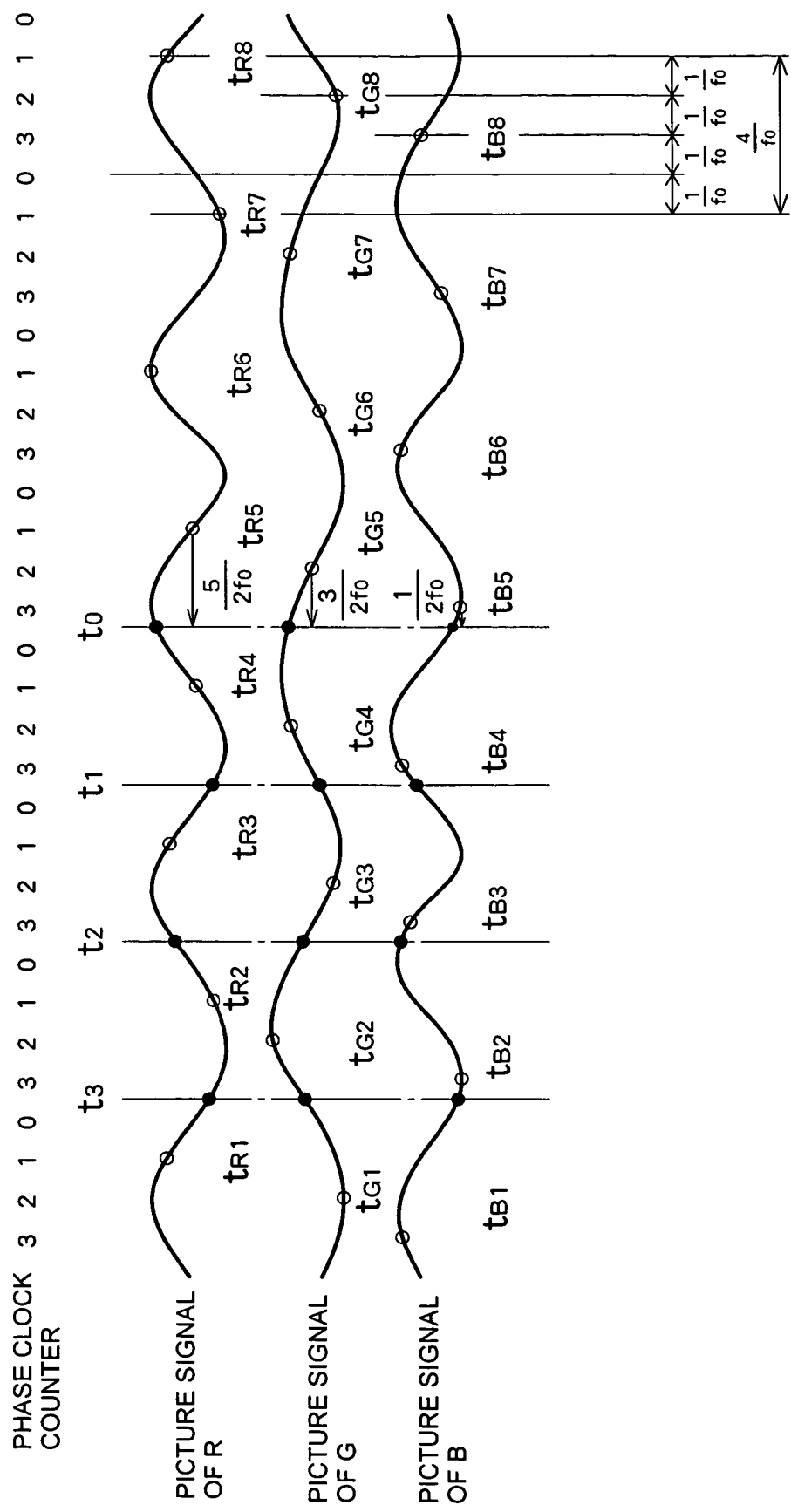
FIG. 5 is a diagram explaining the action of the interpolation filter in the first embodiment.

For example, consider a case where the changeover switches 20a, 20b change over terminals for the picture signals of R, G, and B and a dummy signal in turn at a sampling frequency $f_0/4$, and the picture signal of R is sampled at times $t_{R1}$–$t_{R8}$ when the count value of the phase clock counter is 1, as shown in FIG. 5. When the reference interpolation time $t_0$ is set $5/(2f_0)$ behind the time $t_{R5}$, values shown in the column of phase 1 in FIG. 6 are assigned to the coefficients of the coefficient arithmetic units 34-1 to 34-8, in correspondent with the count value of the phase clock counter. As a result, a value of the picture signal of R at the reference interpolation time $t_0$ can be estimated. In this case, the interpolation filter 30 functions as an interpolation filter having low pass characteristics with a passband between frequency 0 and $f_0/8$ as shown by line B (dashed line) in FIG. 3.

The interpolation filters 30 for the picture signals of G and B can be constructed similarly. The reference interpolation time $t_o$ that is $5/(2f_0)$ behind the sampling time $t_{R5}$ only for the picture signal of R corresponds to a time that is $3/(2f_0)$ behind the sampling time $t_{G5}$ only for the picture signal of G and a time that is $1/(2f_0)$ behind the sampling time $t_{B5}$ only for the picture signal of B. Therefore, a value of the picture signal of G at the common reference interpolation time $t_0$ can be estimated by assigning values shown in the column of phase 2 in FIG. 6 to the coefficients $\alpha_1$–$\alpha_8$ of the coefficient arithmetic units 34-1 to 34-8, in correspondent with the count value of the phase clock counter. Similarly, a value of the picture signal of B at the common reference interpolation time $t_0$ can be estimated by the same procedure using values shown in the column of phase 3 in FIG. 6.

Further, each time the A/D converter 24 performs new sampling on the picture signals of R, G, and B, the color blur compensation circuit 26 can find interpolated values at reference interpolation times $t_1$, $t_2$, . . . from the sampling values.

At this time, the phase that governs the coefficients $\alpha_1$–$\alpha_8$ is determined according to: the sampling period of the picture signal of each standard color, the period of the reference interpolation times, and a phase difference between the sampling time used for interpolation and the reference interpolation time. In this embodiment, both the sampling period of the picture signal of each standard color and the period of the reference interpolation times are $4/f_0$, and the reference interpolation times $t_0$, $t_1$, $t_2$, . . . always become times that are $5/(2f_0)$ behind the sampling times $t_{R5}$, $t_{R4}$, . . . of the picture signal of R. Therefore, by performing operations on the sampling values of the picture signal of R using the coefficients $\alpha_1$–$\alpha_8$ of phase 1, interpolated values at the reference interpolation times $t_0$, $t_1$, $t_2$, . . . can be found. Similarly, the reference interpolation times $t_0$, $t_1$, $t_2$, . . . always become times that are $3/(2f_0)$ behind the sampling times $t_{G5}$, $t_{G4}$, . . . of the picture signal of G. By performing operations on the sampling values of the picture signal of G using the coefficients $\alpha_1$–$\alpha_8$ of phase 2, interpolated values at the reference interpolation times $t_0$, $t_1$, $t_2$, . . . can be found. Moreover, the reference interpolation times $t_0$, $t_1$, $t_2$, . . . always become times that are $1/(2f_0)$ behind the sampling times $t_{B5}$, $t_{B4}$, . . . of the picture signal of B. By performing operations on the sampling values of the picture signal of B using the coefficients $\alpha_1$–$\alpha_8$ of phase 3, interpolated values at the reference interpolation times $t_0$, $t_1$, $t_2$, . . . can be found.

As described in the foregoing, the interpolation filter having the low pass characteristics with a passband between frequency 0 and $f_0/8$ is applied to the sampling values of the picture signals of R, G, and B, each picture signal being sampled at periods of $4/f_0$, whereby the respectively picture signals at the identical reference interpolation time $t_0$ can be found. The use of the picture signals of R, G, and B at this reference interpolation time $t_0$ can reduce the color blur of the color video signal. As a result, based on the color video signal, a high-definition picture with excellent color reproducibility can be displayed. Moreover, by enchaining the lowpass characteristics of the interpolation filter, filter characteristics of a reduction filter etc. in a subsequent stage can be moderated, and its circuit configuration can be simplified as well.

Second Embodiment

Figure 7:
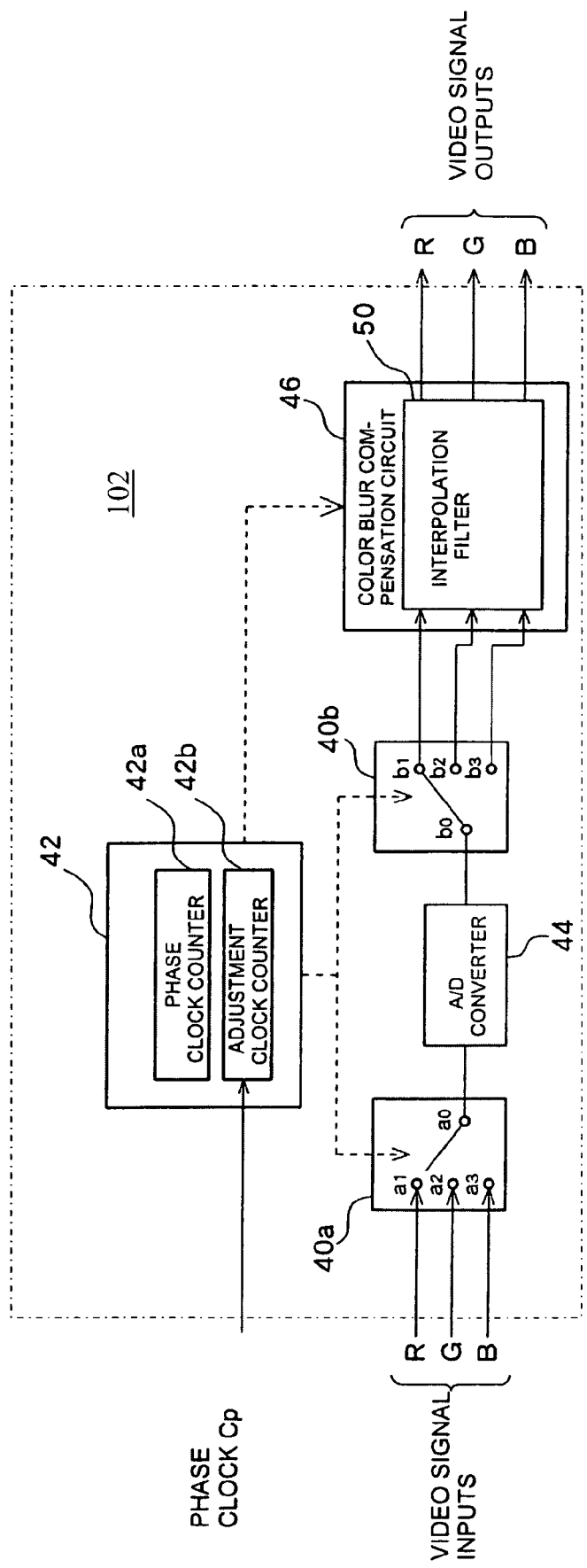
FIG. 7 is a block diagram showing a configuration of the picture signal processor in a second embodiment.

A picture signal processor 102 in the second embodiment of the present invention is constructed with the inclusion of changeover switch circuits 40a, 40b, a control circuit 42, an A/D converter 44, and a color blur compensation circuit 46, as shown in FIG. 7.

The changeover switch circuit 40a is a changeover switch with three input terminals and one output terminal. A color video signal is separated into picture signals of the standard colors of red (R), green (G), and blue (B), which are fed to the input terminals $a_1$–$a_3$ of the changeover switch circuit 40a, respectively. The output terminal $a_0$ of the changeover switch circuit 40a is connected to an input terminal of the A/D converter 44. The changeover switch circuit 40b is a changeover switch with one input terminal and three output terminals. An output signal from the A/D converter 44 is fed to the input terminal $b_0$ of the changeover switch circuit 40b, which outputs the output signal from one of its output terminals $b_1$–$b_3$ according to a connection state of the changeover switch.

The control circuit 42 is constructed with the inclusion of the phase clock counter 42a and the adjustment clock counter 42b. The phase clock Cp is inputted into the control circuit 42 from outside the picture signal processor 102. The phase clock counter 42a is a 2-bit counter, and counts the phase clock Cp each time it becomes a "H level", changing its count value among 0, 1, and 2 in this order repeatedly. The count value of the phase clock counter 42a indicates the sampling periods of the picture signals of the standard colors. For example, when the count values of the phase clock counter 42a are 0, 1, and 2, sampling is performed on the picture signals of R, G, and B, respectively. The adjustment clock counter 42b is also a 2-bit counter, and counts the phase clock Cp each time it becomes a "H level", changing its count value among 0, 1, 2, and 3 in this order repeatedly. The adjustment clock counter 42b indicates a period at which interpolation is performed for the sampling values of each standard color. The adjustment clock counter 42b is used to adjust a time lag between the sampling period and a period of interpolation to be performed after that. The control circuit 42 outputs control signals to the changeover switch circuits 40a, 40b according to the count value of the phase clock counter 42a. Moreover, the control circuit 42 controls the color blur compensation circuit 46 according to the count values of the phase clock counter 42a and of the adjustment clock counter 42b.

The changeover switch circuits 40a, 40b are changed over by the control signals from the control circuit 42. In this case, changeover is controlled so that the terminals $a_1$ and $b_1$, the terminals $a_2$ and $b_2$, and the terminals $a_3$ and $b_3$, each making a pair, are connected to the A/D converter 44 at an identical timing, respectively, according to the count value of the phase clock counter 42a, as shown in FIG. 8. At the time the count value of the phase clock counter 42a is 0, the input terminal $a_1$ is connected to the output terminal $a_0$, and the input terminal $b_0$ is connected to the output terminal $b_1$, whereby the picture signal of R is inputted into the A/D converter 44 and sampled to perform digitization. Similarly, at the time the count value of the phase clock counter 42a is 1, the picture signal of G is sampled and thereby digitized, and at the time the count value of the phase clock counter 42a is 2, the picture signal of B is sampled and thereby digitized. Therefore, assuming that the phase clock Cp is a frequency $f_0$, the picture signals of R, G, and B are sampled with a sampling frequency $f_0/3$, respectively.

For example, if setting the frequency $f_0$ of the phase clock Cp to 27 MHz, the picture signals of R, G, and B are sampled with a sampling frequency of $f_0/3=9$ MHz, respectively. Assuming that, when the picture signal is sampled with a sampling frequency of 13.5 MHz, a single horizontal line is represented with 720 pixels, when each of the picture signals of R, G, and B is sampled with a sampling frequency of 9 MHz, a single horizontal line will be represented with 480 pixels.

Figure 3:
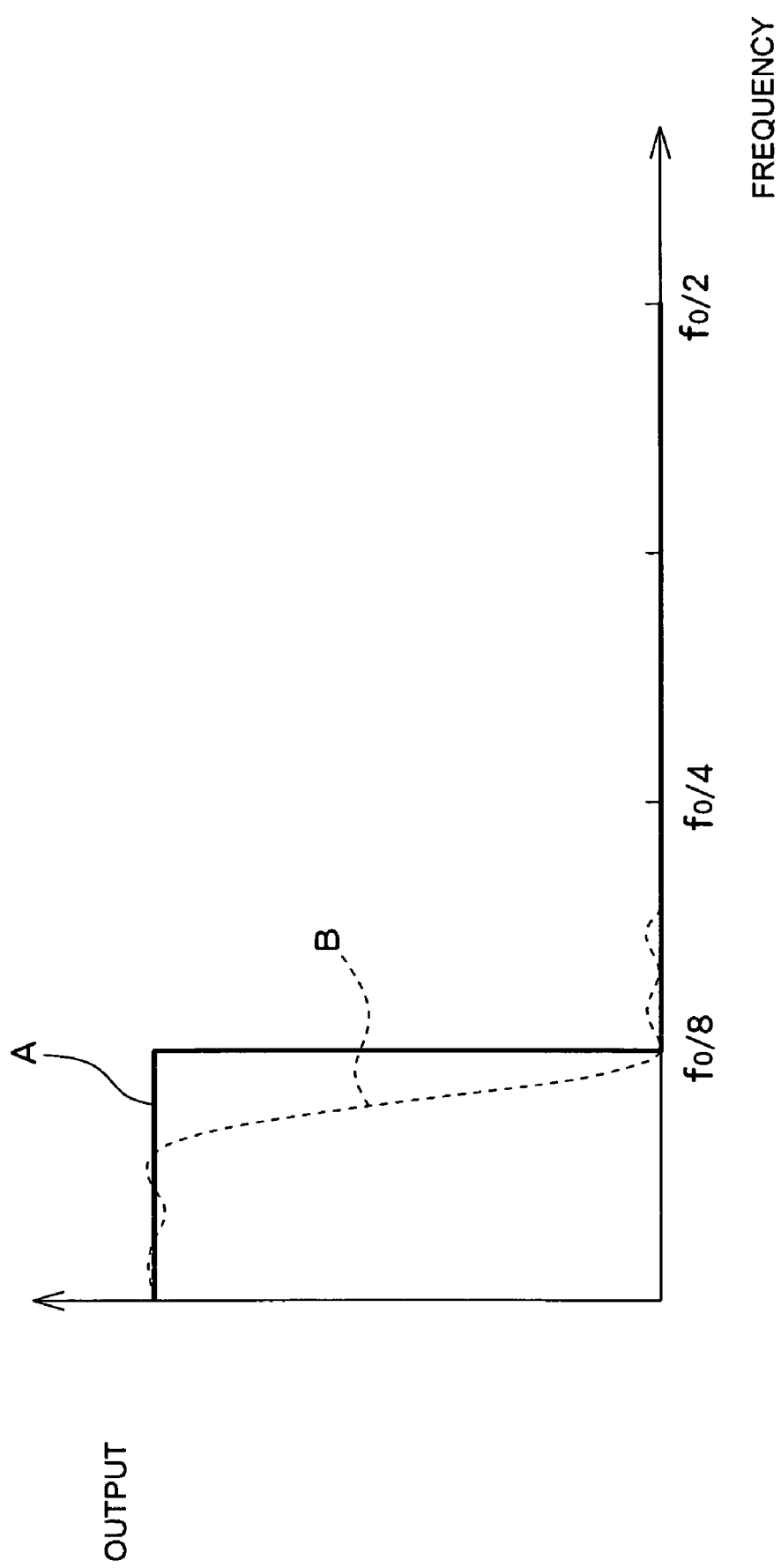
FIG. 3 is a diagram showing frequency characteristics of an interpolation filter in the first embodiment.

The digitized picture signals of R, G, and B are inputted into the color blur compensation circuit 46 after being outputted from the changeover switch circuit 40b, respectively. The color blur compensation circuit 46 is constructed with the inclusion of an interpolation filter 50 having low pass characteristics with a passband between frequency 0 and $f_0/8$ as shown in FIG. 3. By using the interpolation filter having low pass characteristics that allows only signals of a frequency $f_0/8$, the sampling values sampled with a sampling frequency of 6.75 MHz can be found from the sampling values of the picture signal that was sampled with a sampling frequency $f_0/3$. Assuming that, when the picture signal is sampled with a sampling frequency of 13.5 MHz, a single horizontal line is represented with 720 pixels, a picture signal sampled with a sampling frequency of 9 MHz can be converted into a picture signal whose one horizontal line is represented with 360 pixels, as with the first embodiment.

Figure 9:
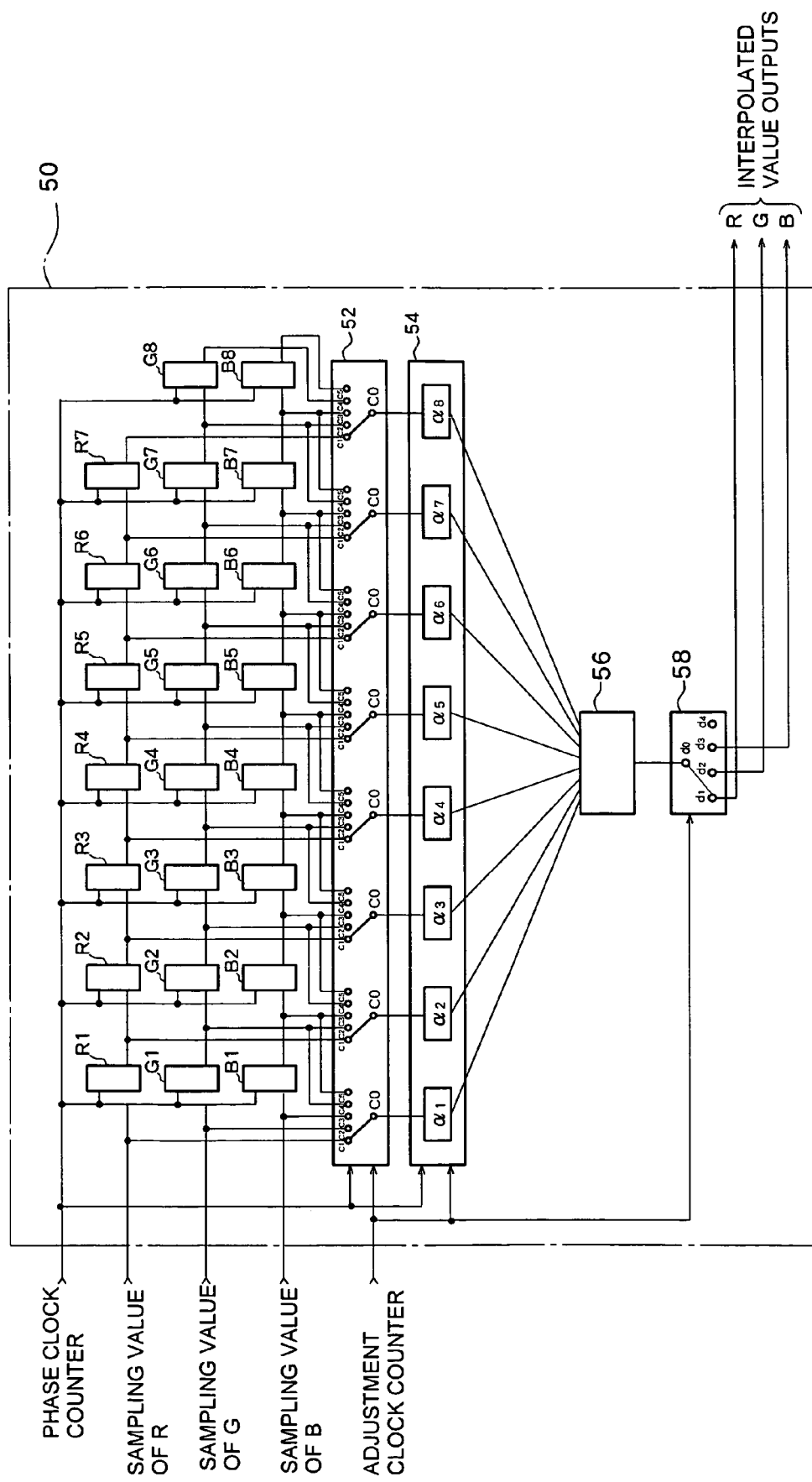
FIG. 9 is a circuit diagram showing a configuration of an interpolation filter in the second embodiment.

The interpolation filter 50 included in the color blur compensation circuit 46 can be constructed with a digital filter with eight taps, as shown in FIG. 9. More specifically, the interpolation filter 50 is constructed with the inclusion of seven shift registers $R_1$–$R_7$ for the sampling values of R, eight shift registers $G_1$–$G_8$ for the sampling values of G, eight shift registers $B_1$–$B_8$ for the sampling values of B, a changeover switch 52, a coefficient arithmetic unit 54, an adder 56, and a changeover switch circuit 58.

The count value of the phase clock counter 42a and the count value of the adjustment clock counter 42b are inputted into the interpolation filter 50, and these count values control the components, respectively. When the count value of the phase clock counter 42a is 0, data held in the shift registers $R_1$–$R_6$ are shifted to their subsequent shift registers on the right, respectively. The shift register $R_1$ newly holds a sampling value from the picture signal of R that has been inputted from the A/D converter 44. A sampling value that is newly sampled from the picture signal of R is inputted into the shift register $R_1$ from the A/D converter 44. Similarly, when the count value of the phase clock counter 42a is 1, the data held in the shift registers $G_1$–$G_7$ are shifted to their subsequent shift registers on the right, respectively. The shift register $G_1$ holds the sampling value from the picture signal of G that has been inputted from the A/D converter 44. A sampling value sampled from the picture signal of G is inputted newly into the shift register $G_1$ from the A/D converter 44. Moreover, when the count value of the phase clock counter 42a is 2, the data held in the shift registers $B_1$–$B_7$ are shifted to their subsequent shift registers on the right, respectively. The shift registers $B_1$ holds the sampling value from the picture signal of B that has been inputted from the A/D converter 44. A sampling value sampled from the picture signal of B is newly inputted into the shift registers $B_1$ from the A/D converter 44.

The sampling values held in the shift registers $R_1$–$R_7$, $G_1$–$G_8$, and $B_1$–$B_8$ are inputted into the changeover switch circuit 52. The changeover switch circuit 52 receives the count values of the phase clock counter 42a and of the adjustment clock counter 42b from the control circuit 42, and selects the sampling values to be inputted into the coefficient arithmetic unit 54. The changeover switch circuit 52 is provided with eight changeover switches each having five input terminals and one output terminal, and each changeover switch connects any one of the input terminals $C_1$–$C_5$ to the output terminal $C_0$. As shown in FIG. 10, changeover switches of the changeover switch circuit 52 are changed over according to a combination of the count values of the phase clock counter 42a and of the adjustment clock counter 42b. In the case where the count value of the adjustment clock counter 42b is 0, regardless of the count value (0, 1, and 2) of the phase clock counter 42a, the input terminal $C_1$ and the output terminal $C_0$ will be connected, and a newly inputted sampling value from the picture signal of R and the sampling values held in the shift registers $R_1$–$R_7$ of R will be inputted into the coefficient arithmetic units 54-1 to 54-8, respectively. In the case where the count value of the adjustment clock counter 42b is 1, when the count value of the phase clock counter 42a is either 0 or 2, the input terminal $C_2$ and the output terminal $C_0$ will be connected, and a newly inputted sampling value from the picture signal of G and the sampling values held in the shift registers $G_1$–$G_7$ will be inputted into the coefficient arithmetic units 54-1 to 54-8, respectively. When the count value of the phase clock counter 42a is 1, the input terminal $C_4$ and the output terminal $C_0$ will be connected, and the sampling values held in shift registers $G_1$–$G_8$ will be inputted into the coefficient arithmetic units 54-1 to 54-8, respectively. In the case where the count value of the adjustment clock counter 42b is 2, when the count value of the phase clock counter 42a is 1, the input terminal $C_3$ and the output terminal $C_0$ will be connected, and a newly inputted sampling value from the picture signal of B and the sampling values held in the shift registers $B_1$–$B_7$ will be inputted into the coefficient arithmetic units 54-1 to 54-8, respectively. When the count value of the phase clock counter 42a is either 0 or 2, the input terminal $C_5$ and the output terminal $C_0$ will be connected, and the sampling values held in shift registers $B_1$–$B_8$ will be inputted into the coefficient arithmetic units 54-1 to 54-8, respectively. When the count value of the adjustment clock counter 42b is 3, it is not necessary to find an interpolated value and hence the changeover switch may be connected to any terminal.

A coefficient arithmetic unit 54 calculates products of the sampling values inputted from the changeover switch circuit 52 and the coefficients $\alpha_1$–$\alpha_8$ specified for the coefficient arithmetic units 54-1 to 54-8, respectively, and outputs them to the adder 36. A shown in FIG. 11, the phase is determined by a combination of the count values of the phase clock counter 42a and of the adjustment clock counter 42b. The coefficients $\alpha_1$–$\alpha_8$ of the coefficient arithmetic units 54-1 to 54-8 are set up for each phase, as shown in FIG. 12. At this time, the phase that governs the coefficients $\alpha_1$–$\alpha_8$ is determined according to: the sampling period of the picture signal of each standard color, the period of primary interpolation times, and a phase difference between the sampling time used for interpolation and the reference interpolation time. When the coefficients of phase 0 have been set up, the interpolation filter 50 functions as a filter that estimates a value at a reference sampling time that is $1/(2f_0)$ behind a time at which the sampling value to be multiplied by the coefficient $\alpha_5$ was sampled. Similarly, when the coefficients of phase 1 have been set up, the interpolation filter 50 functions as a filter that estimates a value at a reference sampling time that is $3/(2f_0)$ behind a time at which the sampling value to be multiplied by the coefficient $\alpha_5$ was sampled. Similarly, when the coefficients of phase 2 were set up, the interpolation filter 50 functions as a filter that estimates a value at a reference sampling time that is $5/(2f_0)$ behind a time at which the sampling value to be multiplied by the coefficient $\alpha_5$ was sampled.

The adder 56 adds all the calculated values received from the coefficient arithmetic units 54-1 to 54-8 and outputs the sum as an estimate. The changeover switch circuit 58 receives the count value of the adjustment clock counter 42b from the control circuit 42 and selects an output destination of the adder 56. At the time at which the count value of the adjustment clock counter 42b is 0, the input terminal $d_0$ and the output terminal d, are connected and the output value of the adder 56 is outputted as an interpolated value of R. Similarly, at the time at which the count value of the adjustment clock counter 42b is 1, the input terminal $d_0$ and the output terminal $d_2$ are connected and the output value of the adder 56 is outputted as an interpolated value of G. Moreover, at the time at which the count value of the adjustment clock counter 42b is 2, the input terminal $d_0$ and the output terminal $d_3$ are connected and the output value of the adder 56 is outputted as an interpolated value of B. Furthermore, at the time the count value of the adjustment clock counter 42b is 3, there is no need to find an interpolated value, and so the input terminal $d_0$ and the output terminal $d_4$ (dummy terminal) are connected.

Figure 13:
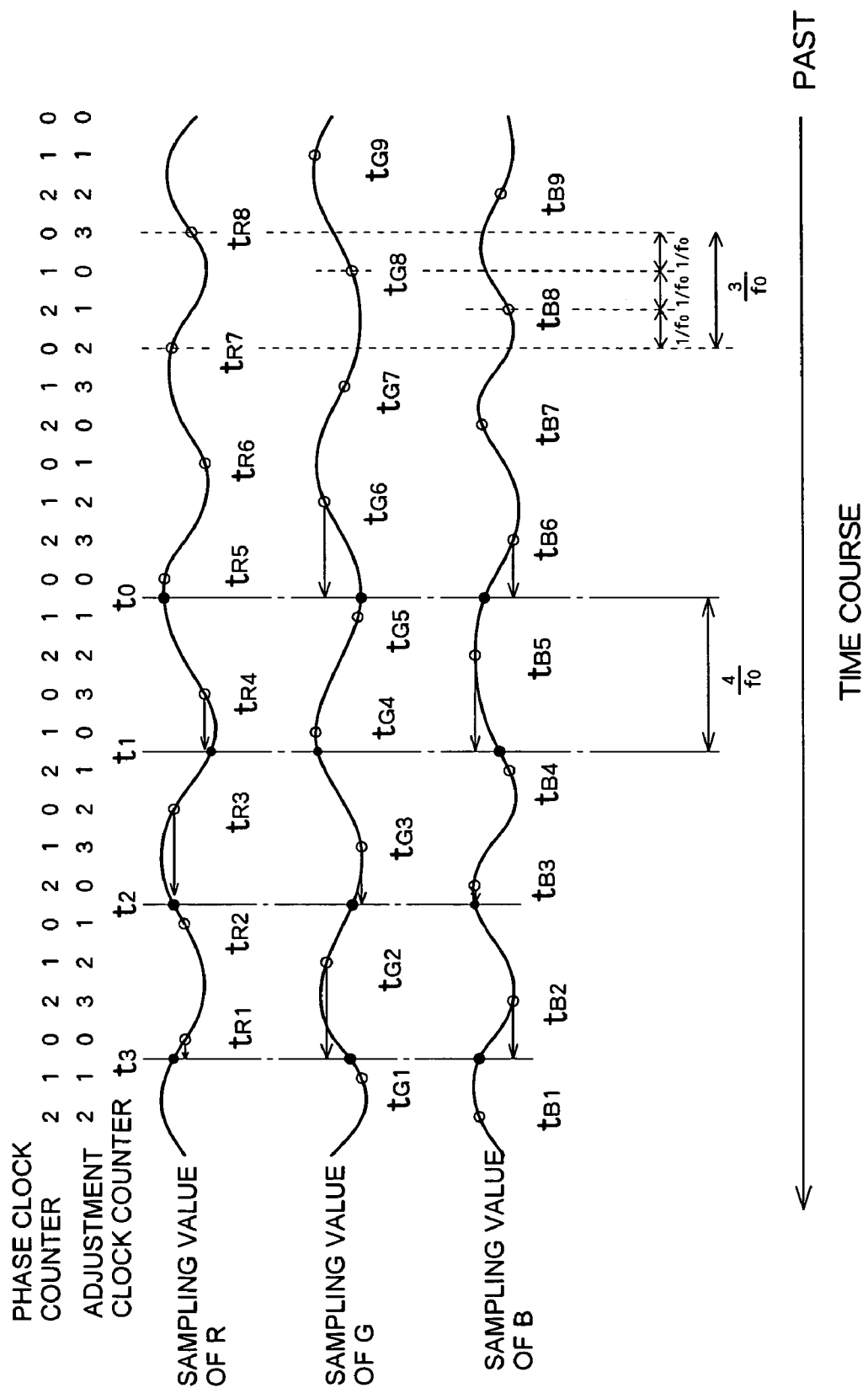
FIG. 13 is a diagram explaining the action of the interpolation filter in the second embodiment.
Figure 14:
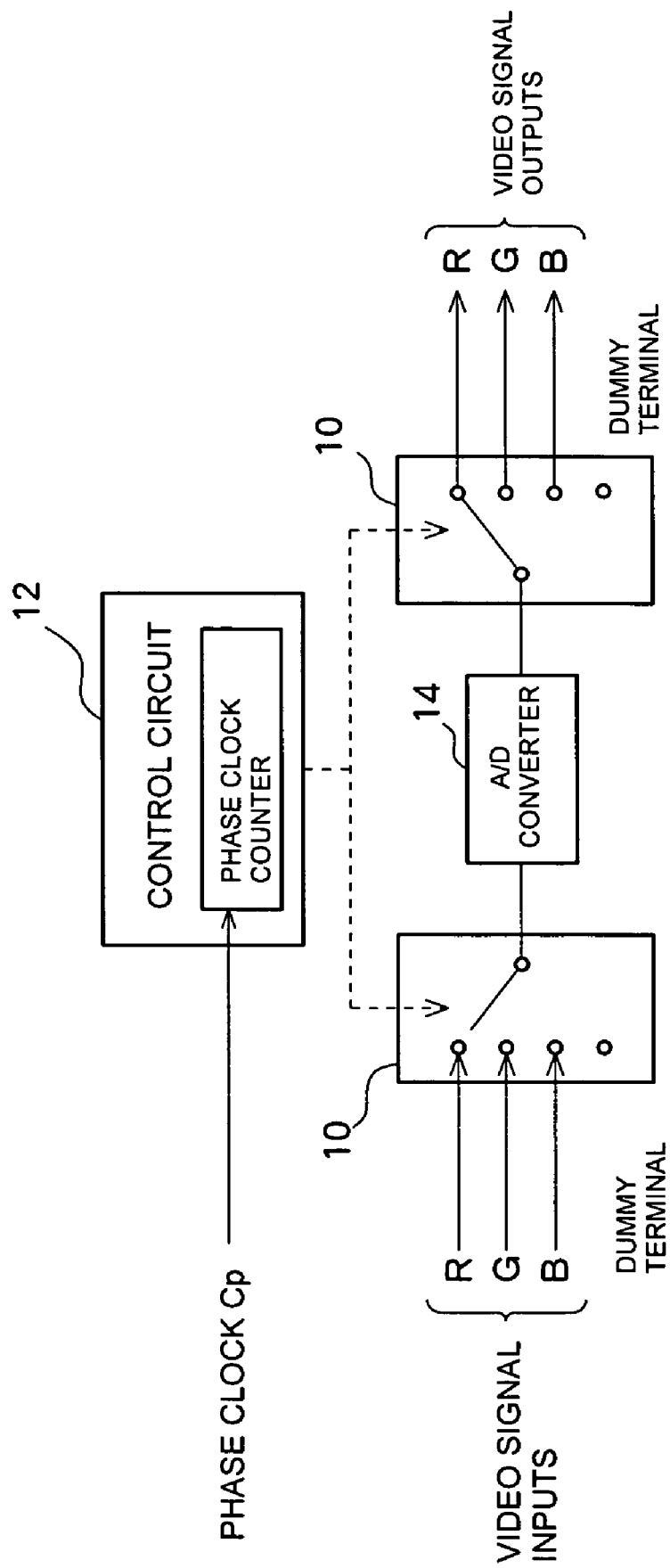
FIG. 14 is a block diagram showing a configuration of the picture signal processor in the background art.
Figure 15:
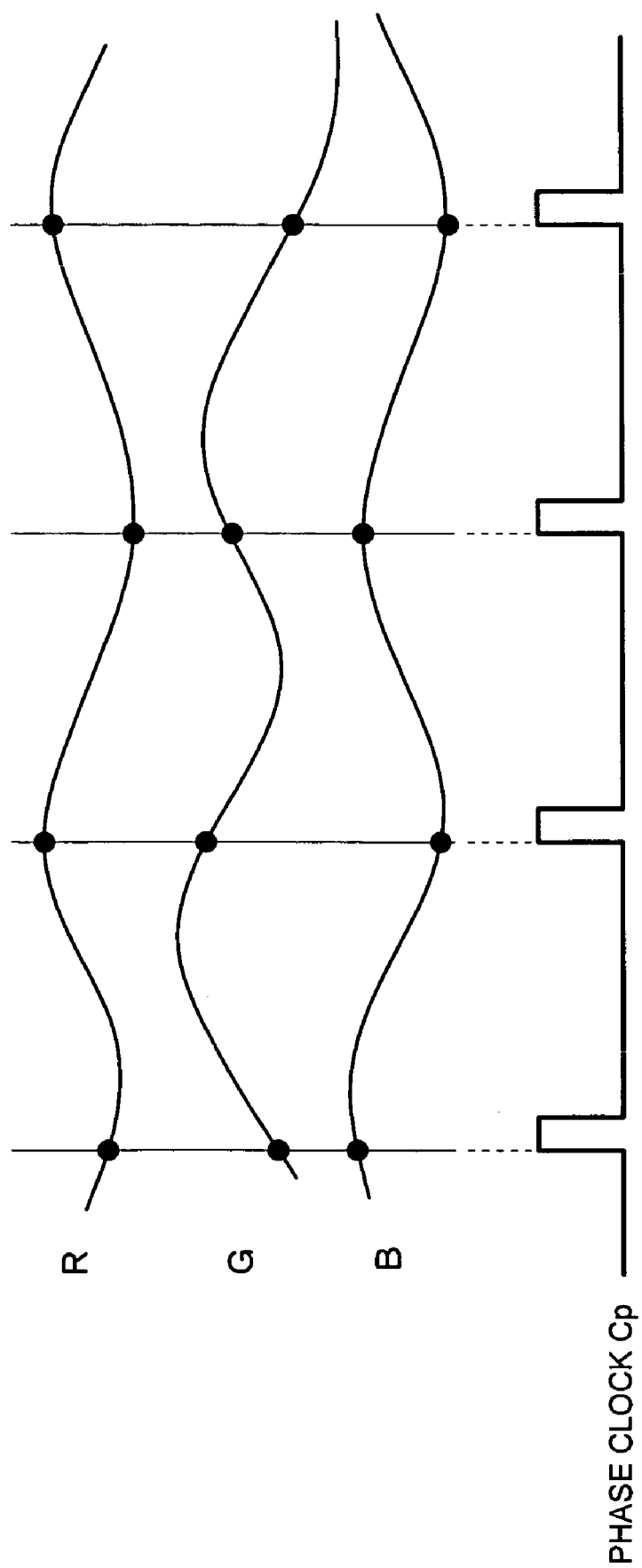
FIG. 15 is a diagram showing a state of sampling by the picture signal processor equipped with individual A/D converters for the picture signals, respectively.
Figure 16:
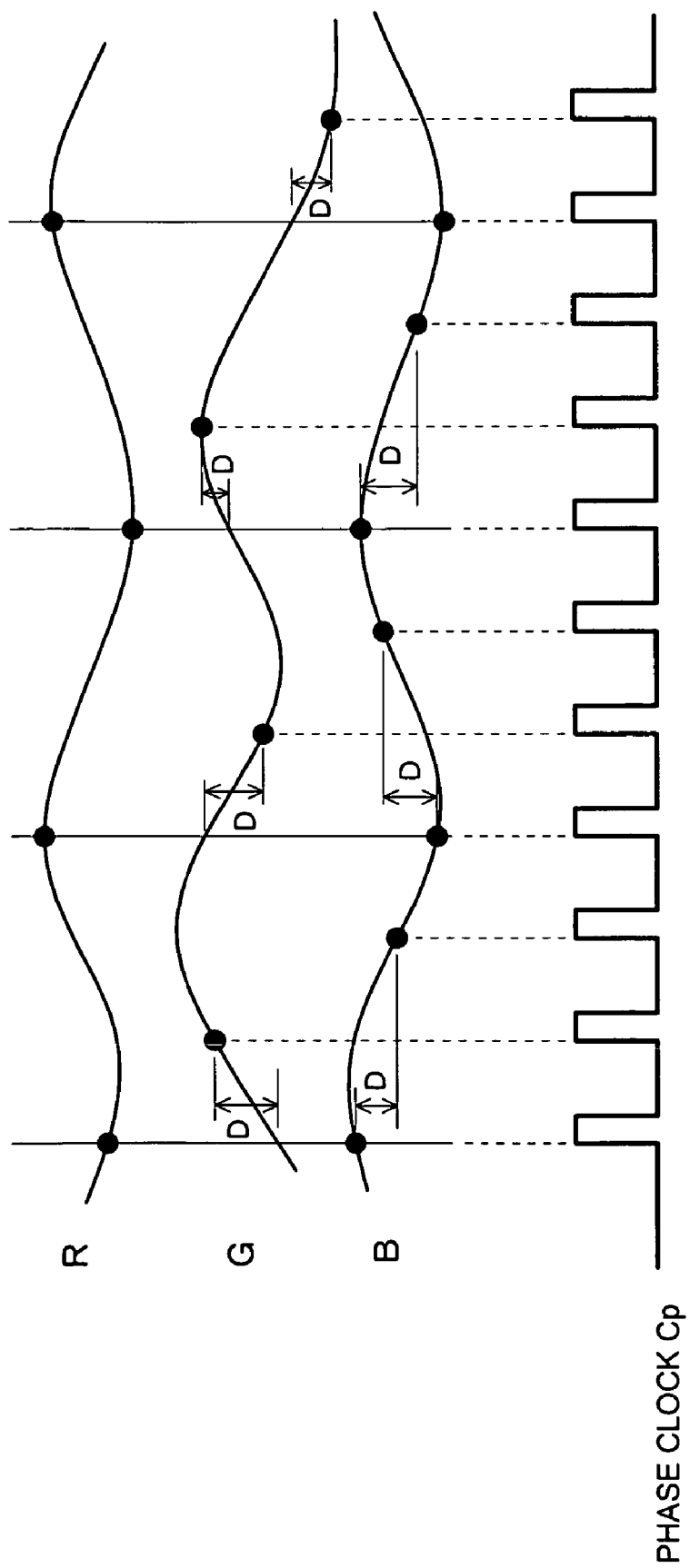
FIG. 16 is a diagram showing a state of sampling by the picture signal processor equipped with a single A/D converter that is being changed over for the picture signals.

The action of the picture signal processor in this embodiment will be described using FIG. 13. When the two count values of the phase clock counter 42a and of the adjustment clock counter 42b are 0, the A/D converter 44 performs sampling on the picture signal of R. Since the count value of the phase clock counter 42a is 0, the data of the shift registers $R_1$–$R_6$ are shifted to the subsequent shift registers, respectively, the shift register $R_1$ holds a sampling value fed to its input terminal, and a sampling value newly sampled from the picture signal of R is inputted into the interpolation filter 50. The changeover switch circuit 52 connects an input terminal $C_1$ and an output terminal $C_0$, and the sampling value newly sampled from the picture signal of R and the sampling values held in the shift registers $R_1$–$R_7$ are inputted into the coefficient arithmetic units 54-1 to 54-8, respectively. In the coefficient arithmetic unit 54, the coefficients $\alpha_1$–$\alpha_8$ of phase 0 are set up. Moreover, the changeover switch circuit 58 connects the input terminal $d_0$ and the output terminal $d_1$. As a result, the interpolation filter 50 finds an interpolated value of the picture signal of R at the reference sampling time $t_0$ that is $1/(2f_0)$ behind the time $t_{R5}$ at which the sampling value held in the shift register $R_5$ was sampled, the interpolated value being outputted from the color blur compensation circuit 26.

Next, when the phase clock Cp is inputted into the control circuit 42, the two count values of the phase clock counter 42a and of the adjustment clock counter 42b will be set to 1. At this time, the A/D converter 44 performs sampling on the picture signal of G. Since the count value of the phase clock counter 42a is 1, the data of the shift registers $G_1$–$G_7$ are shifted to the subsequent shift registers, respectively, the shift register $G_1$ holds a sampling value fed to its input terminal, and a sampling value newly sampled from the picture signal of G is inputted into the interpolation filter 50. The change over switch circuit 52 connects the input terminal $C_4$ and the output terminal $C_0$, and the sampling values held in the shift registers $G_1$–$G_8$ are inputted into the coefficient arithmetic units 54-1 to 54-8, respectively. In the coefficient arithmetic unit 54, the coefficients $\alpha_1$–$\alpha_8$ of phase 2 are set up. The changeover switch circuit 58 connects the input terminal $d_0$ and the output terminal $d_2$. As a result, the interpolation filter 50 finds an interpolated value of the picture signal of G at the reference sampling time $t_0$ that is $5/(2f_0)$ behind the time $t_{G6}$ at which the sampling value held in the shift register $G_6$ was sampled, the interpolated value being outputted from the color blur compensation circuit 26.

Next, when the phase clock Cp is inputted into the control circuit 42, the count values of both the phase clock counter 42a and the adjustment clock counter 42b will be set to 2. At this time, the A/D converter 44 performs sampling on the picture signal of B. Since the count value of the phase clock counter 42a is 2, the data of the shift registers $B_1$–$B_7$ are shifted to the subsequent shift registers, respectively, the shift register $B_1$ holds a sampling value fed to its input terminal, and a sampling value newly sampled from the picture signal of B is inputted into the interpolation filter 50. In the changeover switch circuit 52, the input terminal $C_5$ and the output terminal $C_0$ are connected, and the sampling values held in the shift registers $B_1$–$B_8$ are inputted into the coefficient arithmetic units 54-1 to 54-8, respectively. In the coefficient arithmetic unit 54, the coefficients $\alpha_1$–$\alpha_8$ of phase 1 are set up. The changeover switch circuit 58 connects the input terminal $d_0$ and the output terminal $d_3$. As a result, the interpolation filter 50 finds an interpolated value of the picture signal of B at the reference sampling time $t_0$ that is $3/(2f_0)$ behind the time $t_{B6}$ at which the sampling value held in the shift register $B_6$ was sampled, the interpolated value being outputted from the color blur compensation circuit 26.

Similarly with the above, interpolated values at reference interpolation times $t_1, t_2, \ldots$ that are a period $4/f_0$ or integral multiples thereof behind the reference interpolation time $t_0$, respectively, will be found and outputted based on a combination of the count values of the phase clock counter 42a and of the adjustment clock counter 42b.

The interpolation filter having low pass characteristics with a passband between frequency 0 and $f_0/8$ is applied to sampling values of the picture signals of R, G, and B that were sampled at times shifted by one period $(3/f_0)$ of the sampling frequency $f_0/3$, respectively, whereby the picture signals of R, G, and B at the reference interpolation times $t_0, t_1, t_2, \ldots$ that are separated by a period $4/f_0$ can be found. In this case, as shown above, where the period of sampling is different from the period of the reference interpolation times, a time interval between the sampling time and the reference interpolation time for the picture signal of each standard color varies at all times. In order to compensate for this particular relation, the phase clock counter 42a and the adjustment clock counter 42b are used, and the characteristics of the interpolation filter 50 are properly altered based on a combination of these count values. This procedure makes it easy to find interpolated values exactly at the reference interpolation time. As a result, when the picture signals of R, G, and B are superimposed to perform display, the use of the interpolated values at the reference interpolation time can reduce the color blur of the color video signal. Consequently, a high-definition picture with excellent color reproducibility can be displayed based on the color video signal. Moreover, by enhancing the low pass characteristics of the interpolation filter, filtering characteristics of a reduction filter etc. in a later stage can be moderated and its circuit configuration can be simplified.

It should be noted that the present invention is not limited to the above-mentioned embodiments. The interpolation filter included in the color blur compensation circuit is not limited to the digital filter with eight taps, and any filter that can find interpolated values at the common reference time for all the standard colors from sampling values of each standard color may be used. For example, a digital filter having a different number of taps other than eight may be used. Since the accuracy of interpolation can be made higher by using a digital filter having a lot more taps, such modification is preferable.

Moreover, in this embodiment, the video signal is separated into signals of three standard colors of red (R), green (G), and blue (B), but the number and kinds of the standard colors are not limited to this embodiment.

What is claimed is:

1. A picture signal processor, comprising:
   a sampling circuit that receives picture signals of a plurality of standard colors separated from a video signal and samples the picture signals of the plurality of standard colors in turn repeatedly; and
   an interpolation filter that receives sampling values sampled from the plurality of standard colors in the sampling circuit and finds interpolated values at a common reference interpolation time for all the standard colors by subjecting the sampling values to interpolation calculation for each standard color,
   wherein the interpolation filter has low pass characteristics with a passband between 0 and a frequency determined by calculation of ½ the reciprocal of the period of the reference interpolation time.

2. The picture signal processor according to claim 1, wherein the interpolation filter comprises a digital filter that finds interpolated values at the reference interpolation time based on a plurality of sampling values for each standard color sampled continuously.

3. The picture signal processor according to claim 1, further comprising:
   a phase clock counter for counting a period of sampling times of the picture signal of each standard color in the sampling circuit; and
   an adjustment clock counter for counting a period of the reference interpolation times in the interpolation filter; characteristics of the interpolation filter being altered based on a combination of count values of the phase clock counter and of the adjustment clock counter.

4. A picture signal processing method, comprising:
   a sampling step of receiving picture signals of a plurality of standard colors separated from a video signal and sampling the picture signals of the plurality of standard colors; and
   an interpolation step of receiving sampling values sampled from the plurality of standard colors in the sampling step and finding interpolated values at a common reference interpolation time for all the standard colors by subjecting the sampling values to interpolation calculation for each standard color,
   wherein the interpolation filter has low pass characteristics with a passband between 0 and a frequency determined by calculation of ½ the reciprocal of the period of the reference interpolation time.

5. The picture signal processing method according to claim 4, wherein the interpolation filter comprises a digital filter that finds the interpolated values at the reference interpolation time based on a plurality of sampling values for each standard color sampled continuously.

6. The picture signal processing method according to claim 4, further comprising:
   counting the period of sampling times of the picture signals of each standard color using a phase clock counter; and
   counting the period of the reference interpolation times using an adjustment clock counter;
   wherein in the interpolation step, an interpolation process is performed by altering the characteristics of the interpolation filter based on a combination of count values of the phase clock counter and of the adjustment clock counter.

7. A computer readable medium containing picture signal processing instructions for a computer to function as a picture signal processor, the picture signal processor comprising:
   a sampling circuit that receives picture signals of a plurality of standard colors and samples the picture signals of the plurality of standard colors in turn repeatedly; and
   an interpolation filter that receives sampling values sampled from the plurality of standard colors in the sampling circuit and finds interpolated values at a common reference interpolation time for all the standard colors by subjecting the sampling values to interpolation calculation for each standard color.
   wherein the interpolation filter is adapted to function as a filter having low pass characteristics with a pass band between 0 and a frequency determined by calculation of ½ the reciprocal of the period of the reference interpolation time.

8. The computer readable medium according to claim 7, wherein the interpolation filter is adapted to function as a digital filter for finding interpolated values at the reference interpolation time based on a plurality of sampling values of each standard color sampled continuously.

9. The computer readable medium according to claim 7, wherein the interpolation filter is adapted to function as a phase clock counter for counting a period of sampling times of the picture signal of each standard color in the sampling circuit and also as an adjustment clock counter for counting a period of the reference interpolation times in the interpolation filter, and altering the characteristics of the interpolation filter based on a combination of count values of the phase clock counter and of the adjustment clock counter.

* * * * *